United States Patent
Datta et al.

(10) Patent No.: US 10,710,321 B2
(45) Date of Patent: Jul. 14, 2020

(54) ROTOR BLADE MOLD ASSEMBLY AND METHOD FOR FORMING ROTOR BLADE

(71) Applicant: General Electric Company, Schenectady, NY (US)

(72) Inventors: Madireddi Vasu Datta, Bangalore (IN); Afroz Akhtar, Bangalore (IN); Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 15/249,519

(22) Filed: Aug. 29, 2016

(65) Prior Publication Data
US 2016/0368228 A1 Dec. 22, 2016

Related U.S. Application Data

(62) Division of application No. 13/665,997, filed on Nov. 1, 2012, now Pat. No. 9,492,973.

(51) Int. Cl.
| | | |
|---|---|---|
| B29C 70/44 | (2006.01) |
| B29C 65/70 | (2006.01) |
| B29C 65/00 | (2006.01) |
| F03D 1/06 | (2006.01) |
| B29C 33/76 | (2006.01) |
| B29D 99/00 | (2010.01) |
| B29C 65/54 | (2006.01) |
| B29L 31/08 | (2006.01) |
| B29C 65/48 | (2006.01) |
| B29K 105/06 | (2006.01) |

(52) U.S. Cl.
CPC ............ *B29C 70/443* (2013.01); *B29C 33/76* (2013.01); *B29C 65/70* (2013.01); *B29C 66/543* (2013.01); *B29C 66/721* (2013.01); *B29D 99/0028* (2013.01); *F03D 1/0675* (2013.01); *B29C 65/483* (2013.01); *B29C 65/542* (2013.01); *B29C 66/1122* (2013.01); *B29C 66/545* (2013.01); *B29C 66/636* (2013.01); *B29C 66/727* (2013.01); *B29C 66/7487* (2013.01); *B29K 2105/06* (2013.01); *B29L 2031/085* (2013.01); *F05B 2230/21* (2013.01); *Y02E 10/721* (2013.01); *Y02P 70/523* (2015.11)

(58) Field of Classification Search
CPC .......................... B29C 66/543; B29D 99/0028
See application file for complete search history.

(56) References Cited

U.S. PATENT DOCUMENTS

| 2010/0193636 A1* | 8/2010 | De Vita | ................ B29C 66/721 244/123.1 |
| 2011/0100542 A1* | 5/2011 | Faulkner | ................ B29C 33/30 156/245 |

\* cited by examiner

*Primary Examiner* — Ryan M Ochylski
(74) *Attorney, Agent, or Firm* — Dority & Manning, P.A.

(57) ABSTRACT

Methods for forming rotor blades, rotor blade mold assemblies, and cores for rotor blade mold assemblies are disclosed. A method includes providing a first shell substrate on a first mold, providing a generally hollow core on the first shell substrate, providing a second shell substrate on the generally hollow core, and providing a second mold on the second shell substrate. The method further includes flowing a resin into a mold interior defined between the first mold and the second mold.

12 Claims, 4 Drawing Sheets

ROTOR BLADE MOLD ASSEMBLY AND METHOD FOR FORMING ROTOR BLADE

RELATED APPLICATIONS

The present application is a divisional application of U.S. application Ser. No. 13/665,997 filed on Nov. 1, 2012, which is incorporated herein in its entirety by reference hereto.

FIELD OF THE INVENTION

The present disclosure relates in generally to rotor blades, and more specifically to methods and apparatus for forming rotor blades.

BACKGROUND OF THE INVENTION

Wind power is considered one of the cleanest, most environmentally friendly energy sources presently available, and wind generators have gained increased attention in this regard. A modern wind generator typically includes wind turbine and a generator. The wind turbine typically includes a tower, gearbox, nacelle, and one or more rotor blades. The generator is typically housed in the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Further, wind generators are typically grouped together in a wind farm, and may be onshore or offshore.

Rotor blades for use in wind turbines are typically formed in a plurality of separate components, which are then connected together to form the rotor blade. For example, typically known rotor blades are formed in two components—a first component, or half-shell, that includes the pressure side, and a second component, or half-shell, that includes the suction side. These two half-shells are then connected together, typically at the leading edge and the trailing edge by a glue or other suitable bonding material, to form the rotor blade.

Rotor blades formed in this manner, however, may suffer from a variety of disadvantages. For example, the joint locations at which the half-shells or other components are connected together are typically weak and prone to cracking or otherwise failing during operation, and are thus considered potential failure points on the rotor blade, limiting the operational parameters of the rotor blade.

Accordingly, improved methods and apparatus for forming rotor blades are desired in the art. For example, methods and apparatus for forming rotor blades that allow a rotor blade to be formed as a single part, thus eliminating potential failure points caused by connecting of multiple components together, would be desired.

BRIEF DESCRIPTION OF THE INVENTION

Aspects and advantages of the invention will be set forth in part in the following description, or may be obvious from the description, or may be learned through practice of the invention.

In one embodiment of the present disclosure, a method for forming a rotor blade is disclosed. The method includes providing a first shell substrate on a first mold, providing a generally hollow core on the first shell substrate, providing a second shell substrate on the generally hollow core, and providing a second mold on the second shell substrate. The method further includes flowing a resin into a mold interior defined between the first mold and the second mold.

In another embodiment of the present disclosure, a rotor blade mold assembly for forming a rotor blade is disclosed. The rotor blade mold assembly includes a mold comprising an inner surface having an inner contour corresponding to an exterior surface of the rotor blade. The rotor blade mold assembly further includes a shell substrate disposed on the inner surface, and a generally hollow core disposed within the shell substrate, the generally hollow core including a permanent portion.

In another embodiment of the present disclosure, a core for a rotor blade mold assembly is disclosed. The core includes a removable portion, the removable portion including a vacuum layer and a breather layer generally surrounding the vacuum layer. The core further includes a permanent portion, the permanent portion including a first core skin layer generally surrounding the breather layer, a core body layer generally surrounding the first core skin layer, and a second core skin layer generally surrounding the core body layer. The core further includes a removal mechanism connected to the removable portion and configured to remove the removable portion from the permanent portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
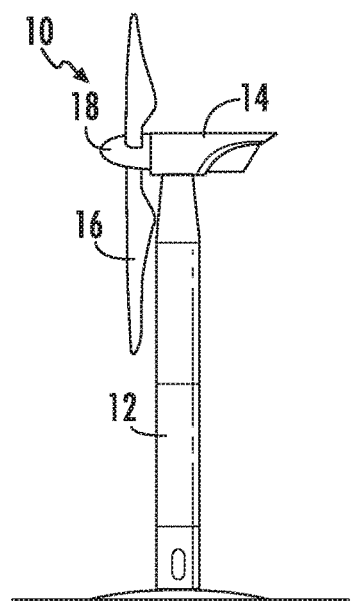
FIG. 1 is a side view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
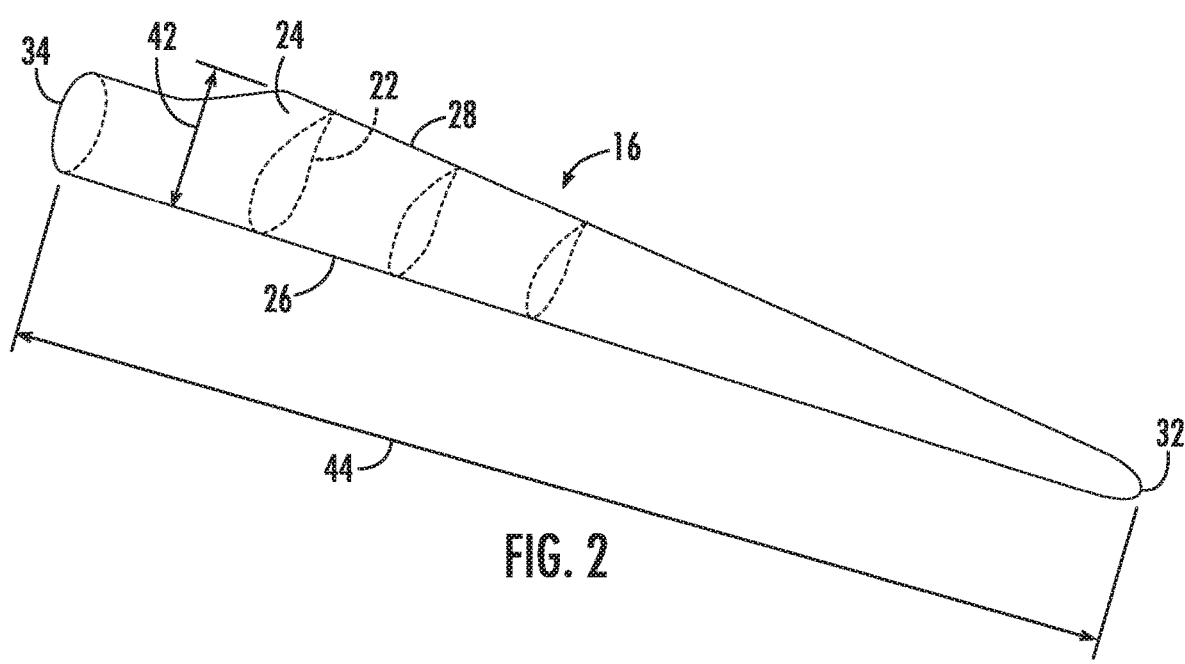
FIG. 2 is a top view of a rotor blade according to one embodiment of the present disclosure.

Referring to FIG. 2, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 42 and a length or span 44. As shown, the chord may vary throughout the span 44 of the rotor blade 16. Thus, a local chord may be defined for the rotor blade 16 at any point on the rotor blade 16 along the span 44.

As shown in FIGS. 3 through 9, the present disclosure is further directed to rotor blade mold assemblies 100 and methods for forming rotor blades 16. A rotor blade mold assembly 100 according to the present disclosure includes a mold, a generally hollow core, and a plurality of layers disposed therebetween which may form the rotor blade 16. Present rotor blade mold assemblies 100 and methods may advantageously allow for rotor blades 16 to be formed therefrom in as singular, generally unitary structures, thus eliminating the need to connect various components thereof to form the rotor blades 16. This in turn may significantly increase the overall strength and operational parameters of the rotor blades 16, due to the elimination of potential failure points that previously existed at these joint locations.

Figure 3:
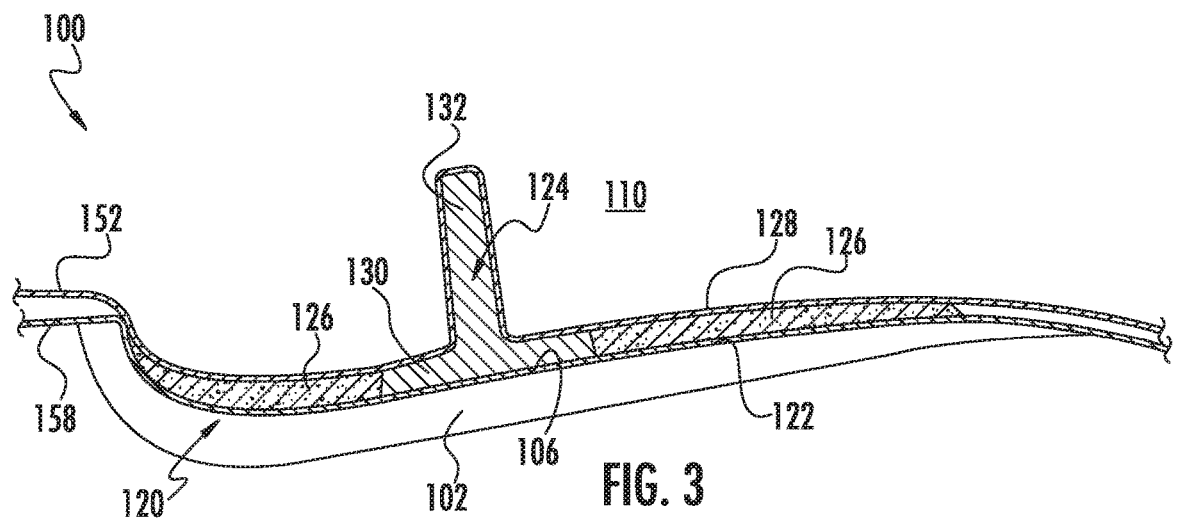
FIG. 3 is a chord-wise cross-sectional view of a rotor blade mold assembly according to one embodiment of the present disclosure.
Figure 4:
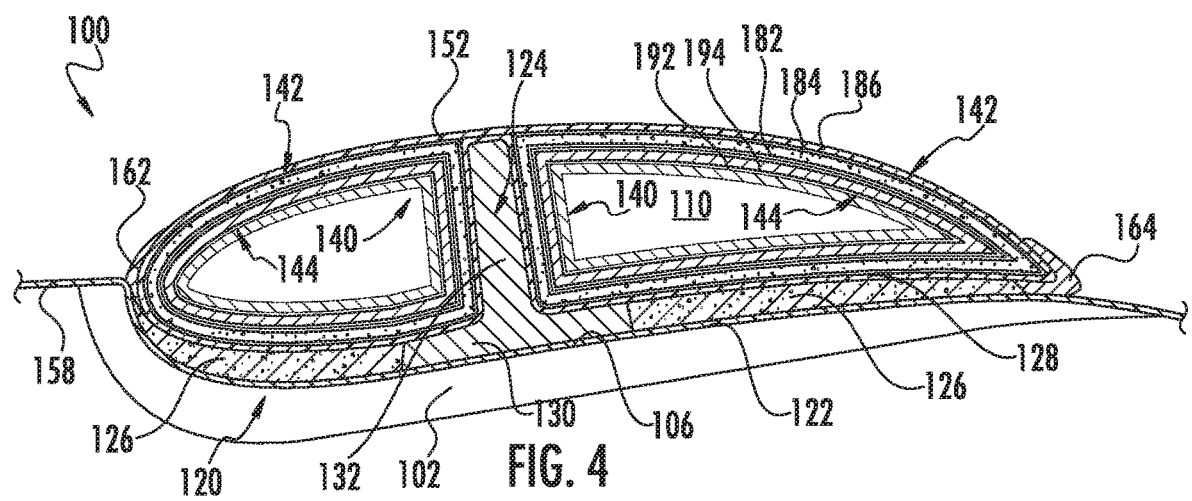
FIG. 4 is a chord-wise cross-sectional view of a rotor blade mold assembly according to another embodiment of the present disclosure.
Figure 5:
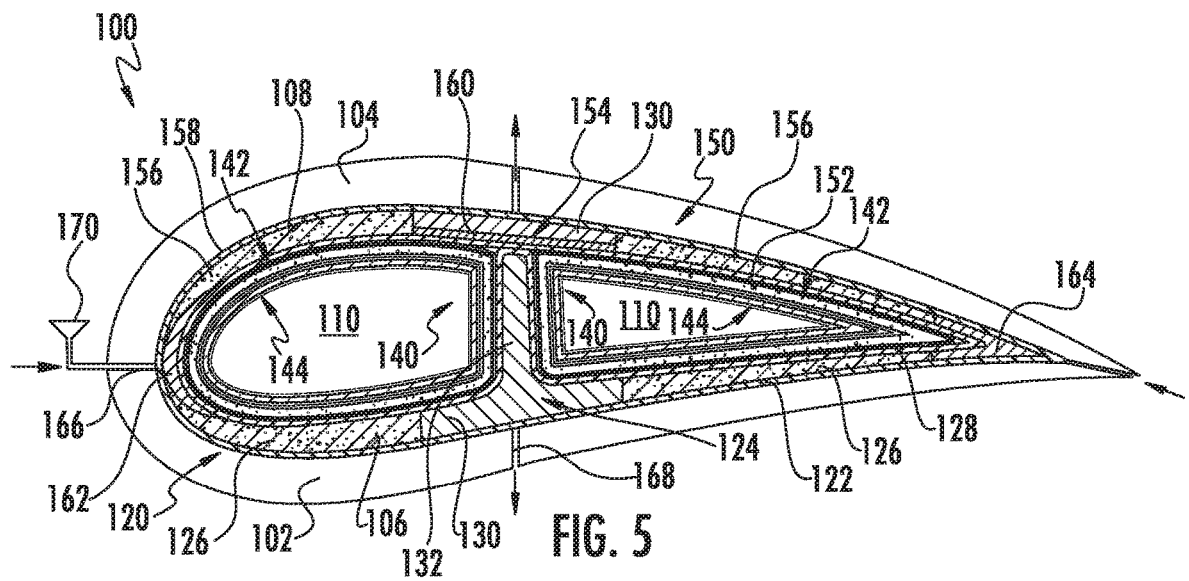
FIG. 5 is a chord-wise cross-sectional view of a rotor blade mold assembly according to another embodiment of the present disclosure.

As shown in FIGS. 3 through 5, a mold assembly 100 according to the present disclosure includes a mold, which may include for example a first mold 102 and a second mold 104. When assembled together to form a rotor blade 16, the overall mold may have an overall inner surface that has an inner contour corresponding to the exterior surfaces of the rotor blade 16. Thus, for example, the first mold 102 may have an inner surface 106 with an inner contour corresponding to one of the pressure side 22 or the suction side 24, and the second mold 104 may have an inner surface 108 with an inner contour corresponding to the other of the pressure side 22 or the suction side 24. In these embodiments, the first mold 102 and second mold 104 may meet when assembled to further form the leading edge 26 and trailing edge 28, and the inner surfaces 106, 108, may thus further correspond to the necessary portions of the leading edge 26 and trailing edge 28. Alternatively, the inner surfaces 106 and 108 may correspond to any suitable portions of the exterior surfaces of the rotor blade 16 to be formed. For example, the inner surface 106 may correspond to the leading edge 26 and portions of the pressure side 22 and suction side 24, and the inner surface 108 may correspond to the trailing edge 28 and portions of the pressure side 22 and suction side 24. Still further, in alternative embodiments, more than two molds may be utilized. The inner surfaces of these molds may correspond to any suitable portions of the exterior surfaces of the rotor blade 16 to be formed, such that the molds when assembled together have an overall interior surface with an overall contour that corresponds to the overall exterior surfaces of the rotor blade 16.

It should additionally be understood that, in exemplary embodiments, the molds may each extend in the span-wise direction from the tip 32 to the root 34 of the rotor blade 16 to be formed, and the interior surfaces may have contours that correspond to the tip 32, root 34, etc., as necessary such that the entire rotor blade 16 may be formed as a singular component. Alternatively, however, the molds may form only a portion of the rotor blade 16 in the span-wise direction.

Various materials may be provided in the mold, such as in an interior 110 of the mold defined by the interior surfaces thereof, to form a rotor blade 16 therein. For example, a shell substrate may be provided on the inner surface of the mold, and a generally hollow core may be disposed within the shell substrate. It should be understood that each of these material may be provide as a singular component in the span-wise direction along the entire span 44 of the rotor blade 16, or may be provided in multiple separate components along the entire span 44, or may be provided through only a portion of the span 44.

For example, a first shell substrate 120 may be provided in the mold, such as on the first mold 102. The first shell substrate 120 may include various materials that may form the rotor blade 16, such as the shell thereof. In exemplary embodiments, for example, the first shell substrate 120 may include one or more first outer skin layers 122, which may be provided on for example the first mold 102. The first shell substrate 120 may further include one or more first structural members 124, which may be provided on the first outer skin layers 122. The first shell substrate 120 may further include one or more first body layers 126, which may additionally be provided on the first outer skin layers 122. The first shell substrate 120 may still further include one or more first inner skin layers 128, which may be provided on the first structural members 124 and the first body layers 126.

The first inner and outer skin layers 122, 128 may be formed from any suitable material, which may serve as a skin of the rotor blade 16 to be formed. Suitable composite materials, such as in exemplary embodiments biaxial materials, are particularly suitable for use as first inner and outer skin layers 122, 128. The composite materials may be formed from, for example, suitable polymers, such as thermoplastics or thermosets, with biaxial fibers embedded therein. Suitable polymers include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoroalkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. Suitable fiber materials include, for example, metal fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other suitable natural or synthetic inorganic or organic fibrous materials.

The first body layers 126 may be formed from any suitable material, which may serve to provide an overall structural integrity to the shell of the rotor blade 16. For example, in some embodiments, a first body layer 126 may be formed from a balsa material, such as balsa wood; a polyvinyl chloride ("PVC") material; or a polyurethane ("PU" material). In exemplary embodiments, the body layer 126 may be foam, which may be formed from any suitable material.

The first structural members 124 may be formed from any suitable material, which may serve to reinforce the rotor blade 16. In exemplary embodiments, a structural member 124 may be formed from a suitable composite material, as discussed above. Further, generally unidirectional composite materials are particularly suitable for applications in structural members 124. The direction of the unidirectional fibers of a unidirectional composite material may in exemplary embodiments be in the span-wise direction.

A first structural member 124 according to the present disclosure may include, for example, one or more spar caps 130 and/or shear webs 132. In the embodiments as shown in FIGS. 3 through 5, a first structural member 124 includes an integral spar cap 130 and shear web 132. Alternatively, the spar cap 130 and shear web 132 may, for example, be separate structural members 124. As mentioned above, it should additionally be understood that a structural member 124 may extend in the span-wise direction throughout the entire span 44 as a single unitary member, or may be provided in separate components along the entire span 44, or may be provided in only a portion of the span 44.

The first body layers 126 may be provided on the first outer skin layers 122 alongside the first structural members 124, on the portions of the first outer skin layers 122 not covered by the first structural members 124. Thus, FIGS. 3 through 5 illustrate one exemplary embodiment in which a structural member 124 comprising an integral spar cap 130 and shear web 132 is situated between two first body layers 126.

It should be understood that a first shell substrate 120 according to the present disclosure is not limited to the various components thereof as discussed above, and rather that any suitable first shell substrate 120 is within the scope and spirit of the present disclosure.

After the first shell substrate 120 is provided on the first mold 102, one or more generally hollow cores 140 may be provided on the first shell substrate 120. The generally hollow cores 140 may define and form an interior of the rotor blade 16 to be formed. For example, in exemplary embodiments as shown in FIGS. 4 and 5, a nose core and a tail core may be provided, and the cores 140 may be disposed on either side of the shear web 132 portion of the first structural member 124. The nose core may define portions of the rotor blade 16 interior adjacent the leading edge 26, and the tail core may defined portions of the rotor blade 16 interior adjacent the trailing edge 28. Additionally or alternatively, one or more root cores (not shown) may be provided. It should be understood, however, that the present disclosure is not limited to nose cores, tail cores, and root cores, and rather that any suitable generally hollow cores that define at least a portions of the interior of the rotor blade 16 to be formed are within the scope and spirit of the present disclosure. It should further be understood that a generally hollow core 140 may extend in the span-wise direction throughout the entire span 44 as a single unitary member, or may be provided in separate components along the entire span 44, or may be provided in only a portion of the span 44. A generally hollow core 140 according to the present disclosure may further include a permanent portion 142 and an optional removable portion 144. Generally hollow cores 140, and the permanent portions 142 and removable portions 144 thereof, will be discussed further in detail below.

After the hollow cores 140 are provided on the first shell substrate 120, a second shell substrate 150 may be provided on the generally hollow cores 140, as well as on any portions of first structural members 124 that are disposed adjacent to the hollow cores 140 such as is shown in FIGS. 4 and 5. For example, the second shell substrate 150 may include one or more second inner skin layers 152, which may be provided on the hollow cores 140 and first structural members 124. The second shell substrate 150 may further include one or more second structural members 154, which may be provided on the second inner skin layers 152. The second shell substrate 150 may further include one or more second body layers 156, which may additionally be provided on the second inner skin layers 152. The second shell substrate 150 may still further include one or more second outer skin layers 158, which may be provided on the second structural members 154 and second body layers 156.

The second inner and outer skin layers 152, 158 may be formed from any suitable material, which may serve as a skin of the rotor blade 16 to be formed, and as discussed above with respect to the first inner and outer skin layers 122, 128. Further, in exemplary embodiments, as shown in FIGS. 3 through 5, a second inner skin layer 152 may be integral with a first inner skin layer 128 and/or a second outer skin layer 158 may be integral with a first outer skin layer 122. Thus, these integral skin layers may be formed as singular components. When the first skin layers 122 and/or 128 are provided in the rotor blade mold assembly 100, the associated integral second skin layers 158 and/or 152 may additionally be provided, and may for example initially extend out of, for example, the first mold 102. After the generally hollow cores 140 are provided, the associated integral second skin layers 158 and/or 152 may then be provided by wrapping these skin layers over the generally hollow cores 140, such that when provided, an integral inner skin layer 122, 158 generally surrounds the hollow core 140 and/or an integral outer skin layer 128, 152 generally surrounds the inner skin layers 122, 158 and the hollow core 140. It should be understood, however, that in alternative embodiments, the inner skin layers 122, 158 and/or outer skin layers 128, 152, may be separate components.

The second body layers 156 may be formed from any suitable material, which may serve to provide an overall structural integrity to the shell of the rotor blade 16, as discussed above with respect to the first body layers 126. The second structural members 154 may be formed from any suitable material, which may serve to reinforce the rotor blade 16, as discussed above with respect to the first structural members 124.

A second structural member 154 according to the present disclosure may include, for example, one or more spar caps 130 and/or shear webs 132, as discussed above with respect to the first structural members 124. In the embodiments as shown in FIG. 5, a second structural member 154 includes a spar cap 130.

The second body layers 156 may be provided on the second inner skin layers 152 alongside the second structural members 154, on the portions of the second inner skin layers 152 not covered by the second structural members 154. Thus, FIG. 5 illustrate one exemplary embodiment in which a structural member 154 comprising a spar cap 130 is situated between two second body layers 156.

In some embodiments, the second shell substrate 150 may further include one or more mat layers 160. The mat layers 160 may be provided, for example, on the second inner skin layers 152 before the second structural members 154 are provided thereon. A mat layer 160 need not cover the entire inner skin layer 152, but rather may in some embodiments cover only the portion on which the second structural members 154 may be disposed. A mat layer 160 may be formed from any suitable material that facilitates bonding of the structural members 154 with the inner skin layer 152. For example, in exemplary embodiments, a mat layer may formed from a composite material, such as a continuous fiber material. A continuous fiber material generally includes fibers that have lengths that are generally limited only by the length of the part, such as the mat in these applications. Suitable composite materials are discussed above with respect to the various skin layers.

In some embodiments, one or more bonding caps may additionally be provided. For example, as shown, leading edge bonding caps 162 and trailing edge bonding caps 164 may be provided. In exemplary embodiments, the bonding caps 162, 164 may be provided after the first shell substrate 120, such as the first inner skin layer 128 thereof, is provided, and/or before the generally hollow cores 140 are provided. Each bonding cap 162, 164 may be formed from any suitable material, which in exemplary embodiments is a composite material. Leading edge bonding caps 162 are in exemplary embodiments formed from a unidirectional or biaxial material, while trailing edge bonding caps 164 are in exemplary embodiments formed from a unidirectional material, as discussed above.

It should be understood that a second shell substrate 150 according to the present disclosure is not limited to the various components thereof as discussed above, and rather that any suitable second shell substrate 150 is within the scope and spirit of the present disclosure.

After the second shell substrate 150 is provided on the generally hollow cores 140, remaining portions of the mold, such as the second mold 104 as discussed above, may be provided on the second shell substrate 150. These remaining portions of the mold may generally enclose the rotor blade substrates 120, 150, such that the rotor blade 16 (or any span-wise portion thereof) can be formed within the mold. Further, inlet ports 166 and outlet ports 168 may be defined in and/or between the various mold portions, such as in and/or between the first mold 102 and the second mold 104, to allow a suitable resin to be provided between in the mold to form the rotor blade 16.

After enclosing the rotor blade substrates 120, 150 and other components, such as the generally hollow cores, in the mold, such as between the first mold 102 and the second mold 104, a resin 170 may be flowed into the mold interior 110. The resin may in generally be a polymer material, such as a suitable thermoplastic or thermoset material as discussed above. The resin 170 may bond with the substrates 120, 150, such as with the various components thereof, and with the permanent portions 142 of the cores 140, to form the rotor blade 16. Additionally, in exemplary embodiments, a vacuum may be applied to the mold, such as to the interior 110 thereof, before the resin 170 is flowed therein, to facilitate the flow of resin 170 and the bonding thereof with the various rotor blade 16 components. The vacuum may continue to be applied during flowing of the resin 170 therein to facilitate such flow 170. One or more vacuum suction levels may be utilized as desired or required to obtain a desired flow of resin 170.

After flowing of the resin 170 into the mold, the resin 170 may be allowed to cure. In some embodiments, once cured, the removable portion 144 of each core 140 may be removed from the generally hollow portion core 140. As discussed, in exemplary embodiments a core includes the permanent portion 142 and the removable portion 144. Exemplary cores 140, in these embodiments nose cores, are illustrated in FIGS. 4 through 8. In other embodiments, however, a core 140 need not have a removable portion 144. In these embodiments, for example, the permanent portion 142 may be pre-cured with resin 170 before being utilized in the mold assembly 100, such that various portions of the removable portion 144 discussed below are not required.

The permanent portion 142 of a core 140 in exemplary embodiments includes various layers. For example, as shown, the permanent portion 142 may include one or more first core skin layers 182, core body layers 184, and second core skin layers 186. The core body layers 184 may generally surround the first core skin layers 182, and the second core skin layers 186 may generally surround the core body layers 184. The core skin layers 182, 186 may be formed from suitable materials as discussed above with respect to the skin layers of the substrates, and the core body layers 184 may be formed from suitable materials as discussed above with respect to the body layer of the substrates.

The removable portion 144 of a core 140 may in exemplary embodiments additionally include various layers. For example, as shown, the removable portion 144 may include one or more vacuum layers 192 and one or more breather layers 194. The vacuum layers 192 may be provided to seal the various other components of the rotor blade 16 to be formed, such as the substrates 120, 150 and permanent portions 142, when the vacuum is applied. A vacuum layer 192 may be formed from, for example, nylon or another suitable material. The breather layers 194 may generally surround the vacuum layers 192, to space the vacuum layers 192 from the permanent portion 142 and facilitate removal of the vacuum layers 192 therefrom. A breather layer 194 may be formed from, for example, cotton, such as a cotton cloth, or another suitable material. In embodiments wherein the removable portion includes breather layers 194 surrounding vacuum layers 192, the permanent portion 142, such as the first core skin layer 182 thereof, may generally surround the breather layers 194.

Figure 6:
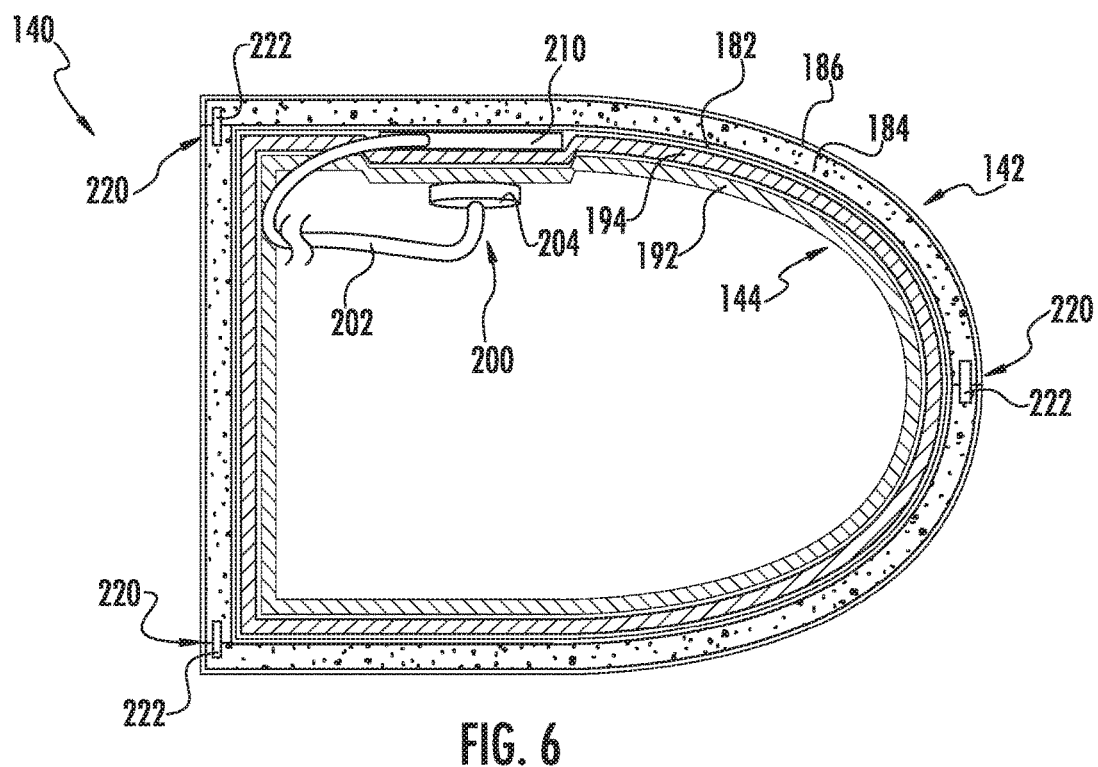
FIG. 6 is a chord-wise cross-sectional view of a generally hollow core for a rotor blade mold assembly according to one embodiment of the present disclosure.
Figure 7:
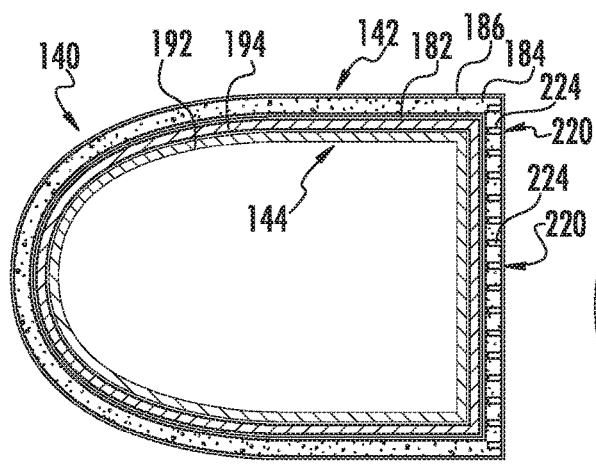
FIG. 7 is a chord-wise cross-sectional view of a generally hollow core for a rotor blade mold assembly according to another embodiment of the present disclosure.
Figure 8:
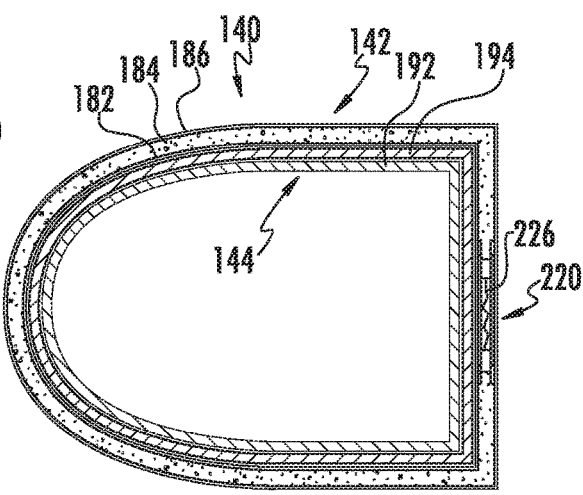
FIG. 8 is a chord-wise cross-sectional view of a generally hollow core for a rotor blade mold assembly according to another embodiment of the present disclosure.

A core 140 according to the present disclosure may in exemplary embodiment further include a removal mechanism 200. The removal mechanism 200 may be connected to the removable portion 144 of the core 140, and may be configured to remove the removable portion 144 from the permanent portion 142. In some embodiments, as shown in FIGS. 6, 7 and 8, for example, the removal mechanism 200 may comprise one or more cords 202. The chord 202 may be connected at one end to the removable portion 144, such as to the breather layer 194 thereof, and the other end may be pulled to remove the removable portion 144. In some embodiments, a sealant 204, such as a tape or other suitable adhesive or fastener, may be utilized to removably connect the other end to the removable portion 144, such as to the vacuum layer 192 thereof, until the removable portion 142 is to be removed. In other embodiments, the removal mechanism 200 may comprise one or more actuators (such as hydraulic or pneumatic cylinders, gear sets, etc.) connected to the removable portion 144, or any other suitable apparatus for removing the removal portion 144. Once removed from the permanent portion 142, the removable portion 144 and the removal mechanism 200 may be removed from the interior of the formed rotor blade 16.

In some embodiments, such as wherein the removal mechanism comprises a cord 202, the removable portion 144 may further include a cap 210. The cap 210 may be fastened to, for example, the breather layer 194, and may connect the cord 202 to the breather layer 194. Thus the cord 202 may be connected to the cap 210. The cap 210 may facilitate removal of the removable portion 144 when the cord 202 is pulled, as discussed above.

In some embodiments, a core 140 according to the present disclosure may further include one or more alignment features 220. Each alignment feature 220 is configured to accommodate movement of the permanent portion 142, especially due to application of the vacuum and during flowing of the resin 170. The alignment features 220 may restrict and/or direct movement of, for example, portions of the core body layer 184 relative to one another due to, for example, compressive or expansive forces such as, for example, when the vacuum is applied. In some embodiments, as shown in FIG. 6, the alignment features 220 are pins 222 disposed between portions of the core body layer 184. In other embodiments, as shown in FIG. 7, the alignment features 220 are slits 224 defined in portions of the core body layer 184. In still other embodiments, as shown in FIG. 8, the alignment features 220 are springs 226 defined between portions of the core body layer 184.

As discussed above, in some embodiments, generally hollow cores 140 may be aligned in a span-wise direction.

Figure 9:
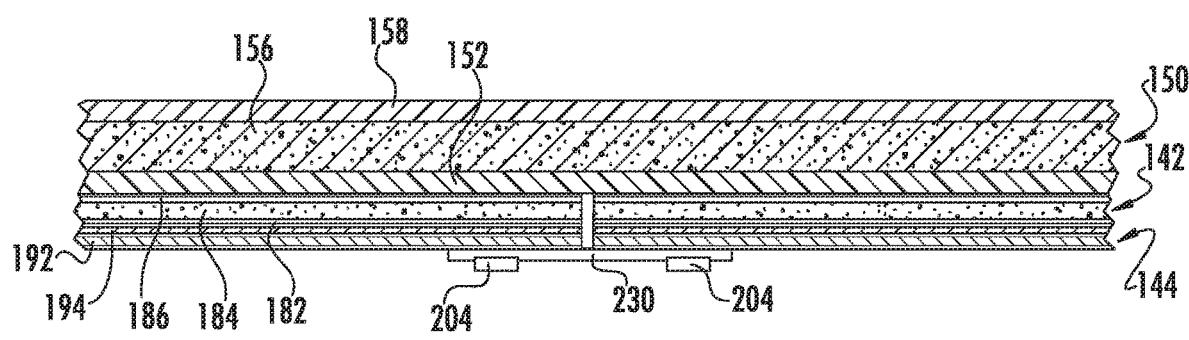
FIG. 9 is a span-wise cross-sectional view of a rotor blade mold assembly according to one embodiment of the present disclosure.

FIG. 9 illustrates a portion of two cores 140, which may be for example, nose cores or tail cores, aligned side-by-side in the span-wise direction. In embodiments wherein a vacuum is applied before resin 170 is flowed into the mold, gaps between these cores 140 may require additional sealing. Thus, in some embodiments, one or more vacuum bags 230, which may for example be formed from the same material as the vacuum layers 192 discussed above, may be provided in a mold. Each vacuum bag 230 may be connected to neighboring generally hollow cores 140, such as to the removable portions 144, and may provide a seal between the cores 140, similar to the seal provided by the vacuum layers 192. A sealant 204 may connect the vacuum bag 230 to the cores 140. The vacuum bags 230 may be removable with the removable layer 144.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for forming a rotor blade, the system comprising:
    a mold comprising an inner surface having an inner contour corresponding to an exterior surface of the rotor blade;
    a shell substrate disposed on the inner surface of the mold, the shell substrate comprising a seamless outer skin layer comprising a first outer skin layer integral with a second outer skin layer; and
    a hollow core disposed atop the shell substrate, the hollow core comprising a permanent portion that remains a part of the rotor blade when formed and a removable portion that is removed from the rotor blade when formed, the permanent portion surrounding the removable portion.

2. The system of claim 1, wherein the mold comprises a first lower mold and a second upper mold.

3. The system of claim 1, wherein the shell substrate further comprises one or more structural members configured for placement atop the first outer skin layer.

4. The system of claim 3, wherein the shell substrate further comprises one or more body layers configured for placement atop the first outer skin layer adjacent to the one or more structural members.

5. The system of claim 4, wherein the shell substrate further comprises a seamless inner skin layer comprising a first inner skin layer integral with a second inner skin layer, the inner skin layer configured for placement atop the one or more structural members and the one or more body layers.

6. The system of claim 1, wherein the hollow core comprises a plurality of hollow cores.

7. The system of claim 6, wherein the plurality of hollow cores comprise a plurality of hollow nose cores and a plurality of hollow tail cores.

8. The system of claim 6, further comprising a plurality of vacuum bags, each of the plurality of vacuum bags connected to neighboring hollow cores of the plurality of hollow cores.

9. The system of claim 1, wherein the permanent portion comprises one or more first core skin layers, one or more core body layers, and one or more core skin layers.

10. The system of claim 1, wherein the removable portion comprises one or more vacuum layers and one or more breather layers, the one or more breather layers generally surrounding the one or more vacuum layers.

11. The system of claim 1, further comprising a removal mechanism connected to the removable portion and configured to remove the removable portion from the permanent portion.

12. The system of claim 1, wherein the removal mechanism comprises an actuator.

\* \* \* \* \*